Dec. 29, 1964 L. STANTON 3,163,305
ARROW TRUENESS TESTER
Filed Dec. 23, 1960
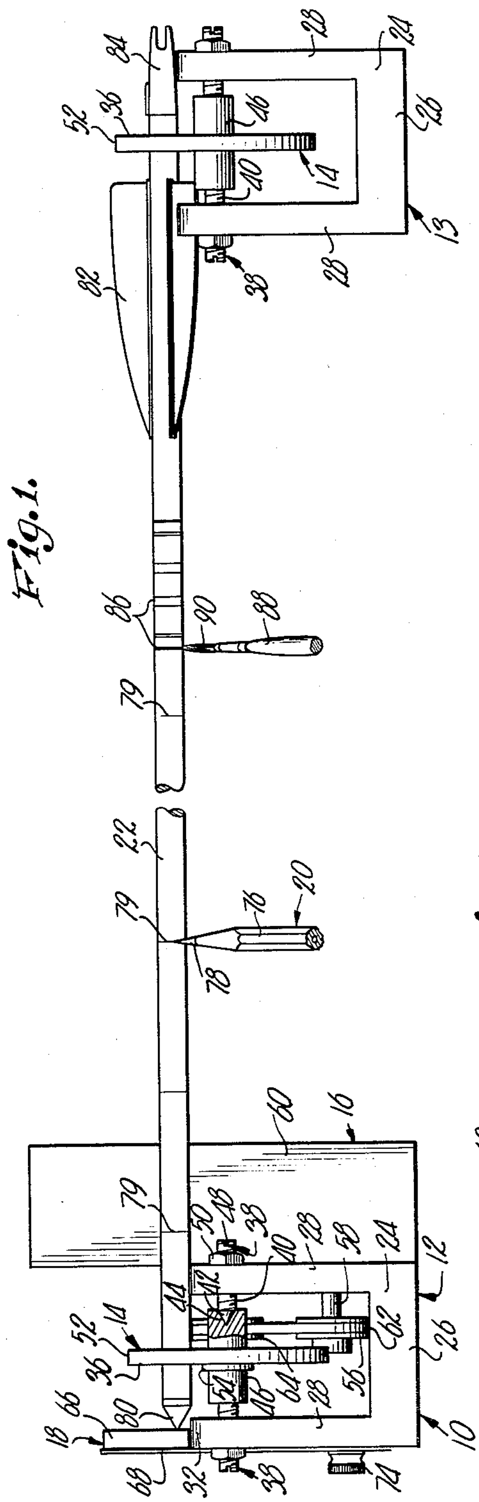
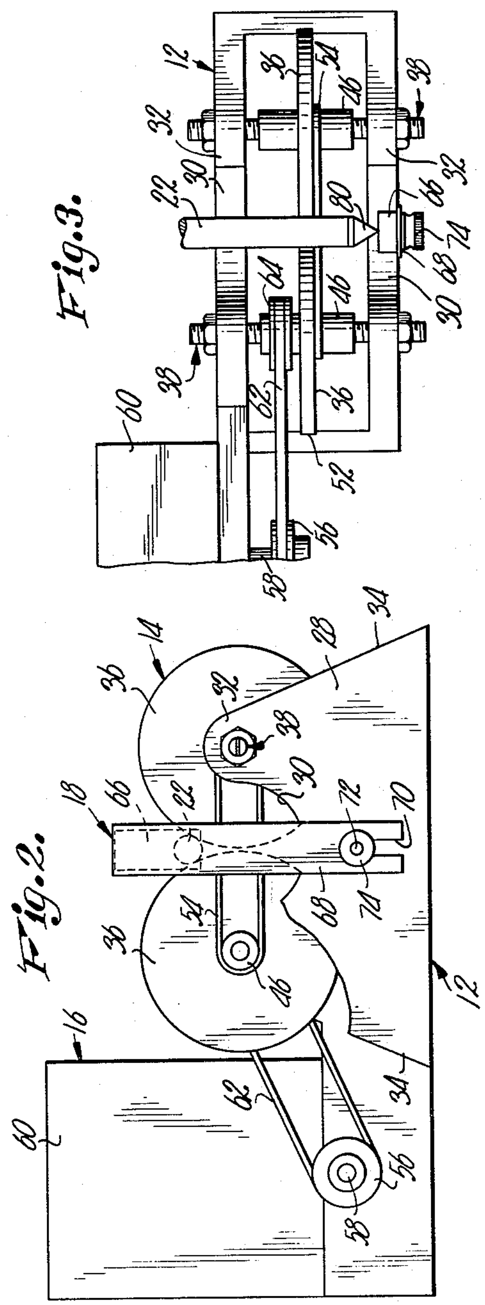
INVENTOR.
Lon Stanton
BY
Hovey, Schmidt, Johnson & Hovey
ATTORNEYS.

United States Patent Office 3,163,305

Patented Dec. 29, 1964

3,163,305

ARROW TRUENESS TESTER

Lon Stanton, Lake Ozark, Mo.

Filed Dec. 23, 1960, Ser. No. 77,890
3 Claims. (Cl. 214—340)

This invention relates to means for testing the trueness of an elongated shaft and, more particularly, to means for determining the eccentricity of a shaft as the same is rotated.

It is the primary object of this invention to provide a trueness tester for an elongated shaft, which tester comprises rotatable means thereon for rotating the shaft, whereby the eccentricity of the shaft may be determined as the shaft is rotated.

Another important object of this invention is the provision of a means for determining the eccentricity of a shaft as the same is rotated, which shaft is provided with a metallic tip adapted to engage said means for maintaining the shaft in a fixed position relative to the latter as the shaft is rotated.

Still another important object of the present invention is the provision of a device for testing the trueness of an elongated shaft having a metallic tip at one end thereof, which device is provided with magnetic means thereon adjacent to the metallic tip of the shaft for attracting the latter and thereby maintaining the shaft in a fixed position relative to the device as the shaft is rotated about its longitudinal axis.

Other important objects of this invention relate to the provision of a pair of spaced supports having rotatable means thereon, whereby the shaft is suitably supported for rotation about its longitudinal axis; to the provision of a pair of rotatable discs mounted on horizontally spaced axes and provided with peripheral edges disposed to form a shaft-bearing surface, whereby the ends of the shaft are supported by the discs and the shaft is rotated by the rotation of the discs; to the provision of power-operated means operably coupled to the discs on one of the spaced supports whereby the shaft is rotated about the longitudinal axis thereof; and to the provision of marking means adapted to be held adjacent to the shaft when the latter is supported by the discs, whereby the eccentricity of the shaft may be noted upon rotation of the shaft by marking the points on the shaft eccentric to the longitudinal axis thereof by the marking device.

Other objects of the present invention will become apparent as the following specification progresses, reference being had to the accompanying drawing, wherein:

FIGURE 1 is a cross-sectional, side elevational view of the trueness tester which is the subject of this invention, illustrating the relation thereto of an elongated shaft in the form of an archer's arrow adapted to be tested for trueness;

FIG. 2 is an end elevational view of the trueness tester shown in FIG. 1, illustrating the relative positions of the power operated means, the rotatable discs and the magnetic means adapted to attract the metallic tip of the shaft to be tested; and FIG. 3 is a fragmentary, plan view of the trueness tester illustrating the drive means for rotating the discs mounted on the horizontally spaced supports.

The trueness tester which is the subject of this invention, is broadly denoted by the numeral 10 and comprises a pair of horizontally spaced supports 12 and 13 adapted to be disposed on a surface such as a worktable, a cradle for receiving and supporting a shaft 22, such cradle being formed by rotatable means 14 carried by each of the supports 12 and 13, power-operated means 16 operably coupled with rotatable means 14 mounted on support 12 for rotating the last-mentioned rotatable means, magnetic means 18 disposed on support 12, and a marking device 20 for marking the shaft 22 as the latter is rotated by rotatable means 14 on each of said supports.

Supports 12 and 13 each comprise a transversely U-shaped member 24 having a bight portion 26 and a pair of spaced side portions 28. Each of said side portions 28 is provided with a central recess 30 therein, defining a pair of spaced, upright projections 32 for a purpose hereinafter described. The side portions 28 are each provided with opposed, inclined edges 34, and projections 32 are provided with threaded apertures (not shown) therethrough for mounting rotatable means 14 between side portions 28 of each of the supports 12 and 13.

Rotatable means 14 comprises a pair of discs 36 disposed between side portions 28 of the respective supports and mounted on opposed projections 32 for rotation about parallel, horizontally spaced axes by virtue of screw means 38 threadably mounted in the threaded apertures of projections 32. As is clear in FIG. 1 of the drawing, screw means 38 on each of the projections 32, comprises an elongated screw 40 having a conical tip 42 at one end thereof complementally received within a conical depression 44 in the hub portion 46 of a respective disc 36 and provided at the opposite end thereof with a slot 48 therein for receiving a tool to rotate screw 40 and thereby reciprocate the same within the aperture of the corresponding projection 32. A lock nut 50, threadably engages screw 40 and the outer surface of the respective side portion 28, to maintain the screw 40 in a fixed position relative to the projection 32 associated therewith. By virtue of the aforesaid construction, discs 36 are mounted for rotation about horizontal axes coincident with the aligned longitudinal axes of opposed screws 40 threadably mounted on opposed projections 32.

Each of discs 36 is provided with a peripheral edge 52 and the hubs 46 of discs 36 are spaced a predetermined distance apart so that when shaft 22 is disposed between discs 36, the shaft 22 will engage the peripheral edges 52 of discs 36 and thereby be supported by the peripheral edges 52 in the manner shown in FIGS. 1 and 2. As is shown, the discs 36 are spaced slightly apart so that the shaft 22 bears against the peripheral edges 52 above the line interconnecting the axes of rotation of discs 36. However, it is conceivable that discs 36 could be slightly overlapping, in which case, the shaft would be disposed in engagement with peripheral edges 52 at a point slightly above the point shown in FIG. 2 of the drawing.

Hubs 46 of each pair of discs 36, are interconnected by means of a continuous, resilient band 54 maintained under tension to impart rotation to one of discs 36 when the other of discs 36 is rotated.

Power-operated means 16 comprises a rotatable pulley 56 rigid to a rotatable shaft 58 operably coupled to an electric motor (not shown) mounted within housing 60 laterally displaced from support 12, it being clear that shaft 58 is substantially parallel with the axes of rotation of discs 36. A continuous, resilient belt 62 operably interconnects pulley 56 with a pulley 64 rigid to hub 46 on one of the discs 36 for imparting rotation to the one disc 36 and thereby the adjacent disc 36 by virtue of the band 54.

Magnetic means 18 comprises a bar magnet 66 rigidly mounted at one end of an elongated strap 68, it being clear that strap 68 is provided at the opposite end thereof with a slot 70 therein for receiving a threaded screw 72 projecting outwardly from the corresponding side portion 28 of support 12. A nut 74 is threadably mounted on screw 72 and engages the proximal face of strap 68 to force the latter into engagement with the side portion 28 associated therewith, and thereby mounts strap 68 in an upright position on support 12. By virtue of slot 70 and mounting means including screw 72 and nut 74, strap 68 may be adjustably mounted on support 12 to thereby raise and lower bar magnet 66 relative to support 12.

Marking device 20 comprises a pencil 76 provided with a marking tip 78 adapted to engage the outer surface of shaft 22, to mark the same as the shaft is rotated. Pencil 76 is adapted to be held by the hand of a user of tester 10 and to be moved longitudinally of shaft 22 to determine the trueness of substantially the entire length of shaft 22.

In operation, a shaft 22 having a metallic tip 80, fletching 82 and a knock 84, is disposed on tester 10 with the opposed ends of shaft 22 in engagement with the peripheral edges 52 of discs 36 rotatably mounted on supports 12 and 13 respectively. In addition, metallic tip 80 of shaft 22, engages magnet 66 at one end of the latter by virtue of the magnetic attraction on tip 80 by magnet 66. It is clear that fletching 82 substantially clears the recess 30 in side portions 28 of support 13 so as to permit shaft 22 to rotate unimpeded about the longitudinal axis thereof.

With the shaft 22 disposed in the manner shown in FIG. 1, the motor in housing 60 is actuated to rotate shaft 58 and thereby discs 36 mounted on support 12, whereupon rotational motion is imparted to shaft 22 since the same engages the peripheral edges 52 of discs 36. As shaft 22 is caused to rotate, the discs 36 on support 13 are set into rotational motion so that shaft 22 is rotated about its longitudinal axis. Shaft 22 is precluded from slight upward displacements by virtue of tip 80 being attracted into engagement with bar magnet 66, which displacements are caused by the friction between the shaft 22 and the peripheral edges 52 of discs 36. The shaft 22 is thereby maintained in a fixed position relative to discs 36 on supports 12 and 13 as shaft 22 is rotated by the engagement thereof with the discs 36 on support 12. The strength of magnet 66 is sufficient to attract metallic tip 80 and to maintain the tip in engagement with magnet 66 during the rotation of shaft 22.

As shaft 22 rotates, pencil 76 is first moved to a position adjacent one end of shaft 22 with marking tip 78 in contact with the outer surface of the shaft. If shaft 22 is eccentric at the position, marking tip 78 will mark the high side of shaft 22, leaving a line 79 which extends only partially around shaft 22. Thus, line 79 will indicate that shaft 22 is eccentric at this position. If shaft 22 is not eccentric at this position, marking tip 78 will mark shaft 22 with a line 79 extending continuously around shaft 22, thus indicating no eccentricity at this position.

Pencil 76 is then moved longitudinally of shaft 22 to mark the latter in the manner described above at spaced positions thereon.

After a series of lines 79 has been applied along the length of shaft 22, an examination of these longitudinally spaced lines will reveal a pattern of eccentricity of shaft 22. Using this pattern as a guide, shaft 22 may be subsequently straightened to thereby return the same to a condition of trueness.

In addition, ornamental stripes 86 may be affixed to shaft 22 by utilizing tester 10, by applying paint from a brush 88 having bristles 90 in engagement with shaft 22 to thereby apply paint as shaft 22 rotates about its longitudinal axis.

It is evident that tester 10 provides an accurate means for determining the eccentricity of an elongated shaft and further, provides a means for maintaining the shaft in a fixed position on the support means therefor as the shaft is rotated by said last-mentioned means. Although the tester 10 is utilized to determine the trueness of an archer's arrow, as shown in the drawing, it is clear that tester 10 may be utilized with any elongated shaft requiring that the same be true throughout the length thereof.

Having thus described the invention, what is claimed as new and desired to be secured by Letters Patent is:

1. In apparatus for testing the trueness of an elongated shaft having a tip at one end thereof composed of a magnetic substance:

a pair of horizontally spaced supports;

a cradle for receiving said shaft comprising a pair of discs mounted on each of said supports respectively for rotation relative to the latter about parallel, horizontally spaced axes, the peripheral edges of each pair of discs being disposed in positions adapted to support there-between a corresponding end of said shaft and to impart rotation to the latter about the longitudinal axis thereof when the discs are rotated;

power-operated means operably coupled to one of said pair of discs for rotating the latter;

a magnet; and means rigidly mounting the magnet on one of said supports in alignment with the longitudinal axis of said shaft, when the latter is received by the cradle, and in disposition to magnetically attract said tip toward the magnet and urge the shaft downwardly against said edges of the discs, whereby to maintain said shaft in a fixed longitudinal and transverse position relative to said supports during rotation thereof by the discs.

2. The invention of claim 1, wherein said magnet presents a stop for engagement with the tip upon attraction thereof by the magnet.

3. The invention of claim 1, wherein said mounting means includes a vertically shiftable member rigid with the magnet and a fastener for releasably attaching the member to said one support at any one of a number of selected vertical dispositions, whereby the magnet may be vertically shifted to locate a pole of the magnet adjacent said tip in a position to exert downward force on the shaft.

References Cited in the file of this patent

UNITED STATES PATENTS

| | | |
|---|---|---|
| 1,189,907 | Barker | July 4, 1916 |
| 1,763,793 | Krebs | June 17, 1930 |
| 2,417,678 | Cox | Mar. 18, 1947 |
| 2,582,043 | Krahulec | Jan. 8, 1952 |
| 2,987,924 | Karrels | June 13, 1961 |

FOREIGN PATENTS

| | | |
|---|---|---|
| 610,747 | Great Britain | Oct. 20, 1948 |